United States Patent
Jacob et al.

(10) Patent No.: US 12,536,277 B2
(45) Date of Patent: Jan. 27, 2026

(54) SFTP BATCH PROCESSING AND CREDENTIALS API FOR OFFLINE FRAUD ASSESSMENT

(71) Applicant: MASTERCARD TECHNOLOGIES CANADA ULC, Vancouver (CA)

(72) Inventors: Jitin Jacob, Surrey (CA); Sunita Khera, Delta (CA); Justine Celeste Fox, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 627 days.

(21) Appl. No.: 17/343,377

(22) Filed: Jun. 9, 2021

(65) Prior Publication Data
US 2022/0398310 A1     Dec. 15, 2022

(51) Int. Cl.
| | |
|---|---|
| *G06F 21/55* | (2013.01) |
| *G06Q 10/10* | (2023.01) |
| *G06Q 30/018* | (2023.01) |

(52) U.S. Cl.
CPC .......... *G06F 21/552* (2013.01); *G06Q 10/10* (2013.01); *G06Q 30/0185* (2013.01); *G06F 2221/033* (2013.01)

(58) Field of Classification Search
CPC ........ G06F 21/00; G06F 21/50; G06F 21/552; G06F 2221/033; G06Q 10/10; G06Q 30/0185; G06Q 50/265
See application file for complete search history.

(56) References Cited

U.S. PATENT DOCUMENTS

| | | | |
|---|---|---|---|
| 10,965,547 B1* | 3/2021 | Esposito | G06F 21/6236 |
| 2017/0091773 A1* | 3/2017 | Amancherla | G06F 21/552 |
| 2019/0250585 A1* | 8/2019 | Rich | B23Q 17/0971 |
| 2019/0303942 A1* | 10/2019 | Balaraman | H04L 63/12 |
| 2020/0082413 A1* | 3/2020 | Tseng | G06F 21/561 |
| 2020/0356676 A1* | 11/2020 | Gorlamandala | G06F 21/577 |

FOREIGN PATENT DOCUMENTS

| | | | | |
|---|---|---|---|---|
| CA | 2821095 A1 * | 6/2012 | | G06Q 20/4016 |
| CA | 2905996 A1 * | 10/2014 | | G06Q 10/04 |
| EP | 3188443 A2 * | 7/2017 | | G06F 21/552 |
| WO | WO-0244986 A2 * | 6/2002 | | G06Q 20/04 |
| WO | WO-2012075323 A1 * | 6/2012 | | G06F 21/51 |

OTHER PUBLICATIONS

International Search Report and Written Opinion for Related Application No. PCT/CA2022/050906 dated Aug. 29, 2022 (22 pages).

* cited by examiner

*Primary Examiner* — Bassam A Noaman
(74) *Attorney, Agent, or Firm* — Michael Best & Friedrich LLP

(57) ABSTRACT

Methods and systems for providing offline fraud assessments with respect to customer login data. One system includes an electronic processor configured to receive an electronic file. The electronic processor is also configured to perform an offline batch processing on the electronic file, where the offline batch processing includes performing a fraud evaluation on the electronic file using a ruleset. The electronic processor is also configured to determine a fraud assessment for the electronic file based on the fraud evaluation. The electronic processor is also configured to generate and transmit a fraud report for display, the fraud report including the fraud assessment.

20 Claims, 5 Drawing Sheets

SFTP BATCH PROCESSING AND CREDENTIALS API FOR OFFLINE FRAUD ASSESSMENT

FIELD

Embodiments described herein relate to secure file transfer protocol ("SFTP") batch processing and credentials application programming interfaces ("APIs"), and more particularly, to providing offline fraud assessments with respect to customer login data using SFTP batch processing and credentials APIs.

BACKGROUND

Organizations lack a low-cost solution to determine whether users logging into their systems are valid. Accordingly, there is a need for a low-cost solution that enables organizations to determine and identify fraudulent user login behavior.

SUMMARY

Accordingly, the embodiments described herein provide methods and systems for providing offline fraud assessments with respect to customer login data using SFTP batch processing and credentials API(s). Embodiments described herein provide an offline login analysis service via batch processing that enables organizations to analyze their user base and identify fraudulent users. Accordingly, the embodiments described herein enable organizations to achieve security with a cost-efficient solution. In particular, the embodiments described herein delivers an offline login analysis service that enables organizations to analyze large amounts of data (for example, log-in data) for their user base with a secure offline process. The relevant data (for example, a risk score, triggered signals, and the like) may be sent to the organization such that the organization may be able to detect fraudulent users.

As one example, an organization may upload an electronic file (for example, a comma-separated values file) via SFTP (either manually or via an automated processes). Once the electronic file is available, data extraction and evaluation processes are triggered. In particular, the data information in the electronic file is analyzed against one or more predetermined rulesets. Once the analysis is complete, the results of the evaluation are made available to the organization (for example, via a fraud report including a fraud assessment).

Accordingly, the embodiments described herein provide a secure way of adding organizations (via a credential API) to an offline login analysis service, enable organizations to use this service without having to directly integrate with one or more APIs, and provide a low-cost solution to determining fraudulent login behavior.

One embodiment provides a system for providing offline fraud assessments with respect to customer login data. The system includes an electronic processor configured to receive an electronic file. The electronic processor is also configured to perform an offline batch processing on the electronic file, wherein the offline batch processing includes performing a fraud evaluation on the electronic file using a ruleset. The electronic processor is also configured to determine a fraud assessment for the electronic file based on the fraud evaluation. The electronic processor is also configured to generate and transmit a fraud report for display, the fraud report including the fraud assessment.

Another embodiment provides a method for providing offline fraud assessments with respect to customer login data. The method includes receiving, via SFTP, an electronic file. The method also includes performing, with an electronic processor, an offline batch processing on the electronic file, wherein the offline batch processing includes performing a fraud evaluation on the electronic file using a ruleset. The method also includes determining, with the electronic processor, a fraud assessment for the electronic file based on the fraud evaluation. The method also includes generating and transmitting, with the electronic processor, a fraud report for display, the fraud report including the fraud assessment.

Yet another embodiment provides a non-transitory, computer-readable medium storing instructions that, when executed by an electronic processor, perform a set of functions. The set of functions includes receiving, via SFTP, an electronic file as a common-separated values file, where the electronic file is a log file of customer login data. The set of functions also includes performing, with an electronic processor, an offline batch processing on the electronic file, wherein the offline batch processing includes performing a fraud evaluation on the electronic file using a ruleset. The set of functions also includes determining, with the electronic processor, a fraud assessment for the electronic file based on the fraud evaluation. The set of functions also includes generating and transmitting, with the electronic processor, a fraud report for display, the fraud report including the fraud assessment.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Figure 1:
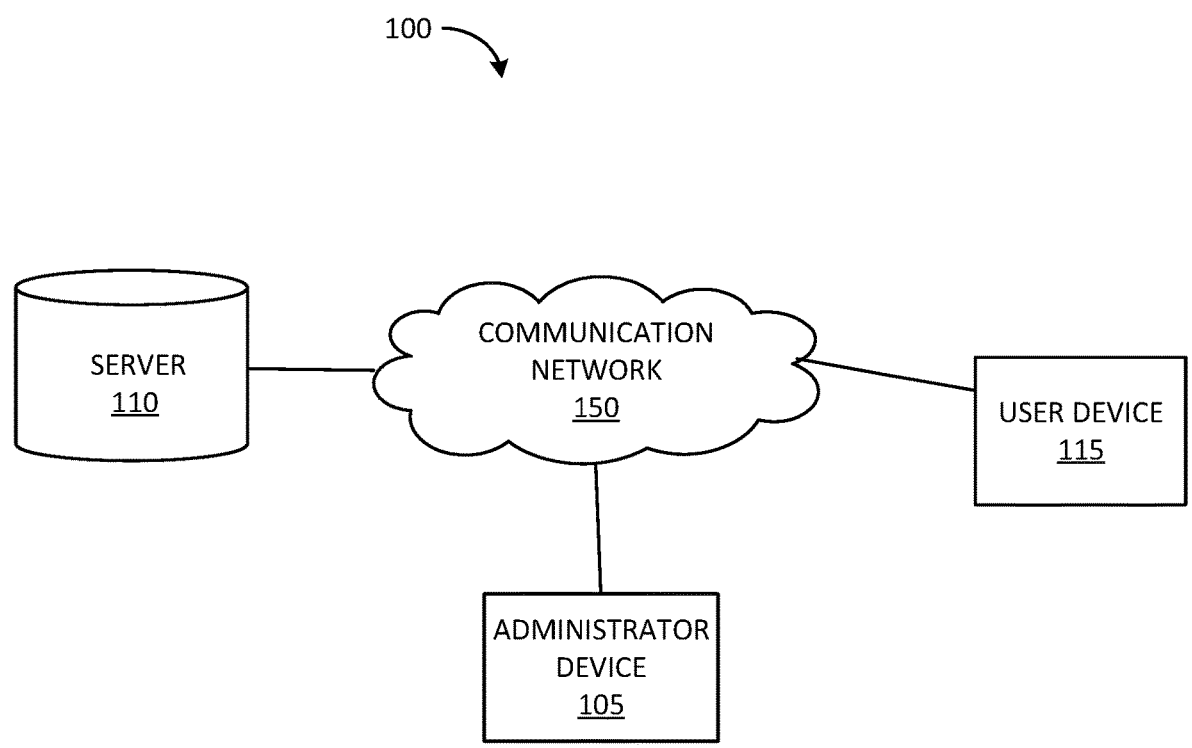
FIG. 1 is a block diagram of a system for providing offline fraud assessments with respect to customer login data according to some embodiments.

FIG. 1 is a block diagram of a system 100 for providing offline fraud assessments with respect to customer login data according to some embodiments. In the example shown, the system 100 includes an administrator device 105, a server 110, and a user device 115. In some embodiments, the system 100 includes fewer, additional, or different components than illustrated in FIG. 1. For example, the system 100 may include multiple administrator devices 105, servers 110, user devices 115, or a combination thereof. Also, in some embodiments, one or more of the components of the system 100 may be distributed among multiple servers, databases, or devices, combined within a single server, database, or device, or a combination thereof.

The administrator device 105, the server 110, and the user device 115 communicate over one or more wired or wireless communication networks 150. Portions of the communication networks 150 may be implemented using a wide area network ("WAN"), such as the Internet, a local area network ("LAN"), such as a Bluetooth™ network or Wi-Fi, and combinations or derivatives thereof. Alternatively or in addition, in some embodiments, the components of the system 100 communicate through one or more intermediary devices not illustrated in FIG. 1. Also, in some embodiments, components of the system 100 (or a portion thereof) communicate directly through the communication network 150.

Figure 2:
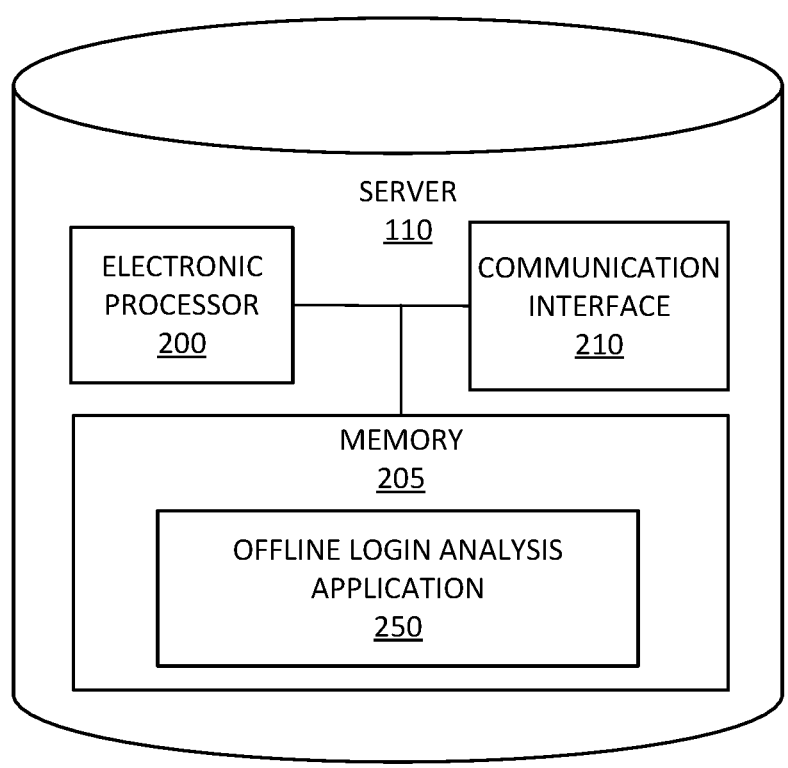
FIG. 2 is a block diagram of the server of the system of FIG. 1 according to some embodiments.

As illustrated in FIG. 2, the server 110 includes an electronic processor 200 (for example, a microprocessor, an application-specific integrated circuit ("ASIC"), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the server 110 may include additional, different, or fewer components than those illustrated in FIG. 2 in various configurations and may perform additional functionality than the functionality described herein. For example, in some embodiments, the functionality (or a portion thereof) described herein as being performed by the server 110 may be distributed among multiple servers or devices (including as part of a cloud-based service).

The communication interface 210 allows the Server 110 to communicate with devices external to the server 110. For example, as illustrated in FIG. 1, the Server 110 may communicate with the administrator device 105, the user device 115, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 150), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 stores an offline login analysis application 250 ("the application 250"). The application 250 is a software application executable by the electronic processor 200. As described in more detail below, the application 250, when executed by the electronic processor 200, provides an offline login analysis service that determines fraudulent user login behavior through electronic files (for example, log files) submitted using SFTP with a predetermined ruleset. In some embodiments, the application 250 provides the offline login analysis service through batch processing handled offline. The application 250 may perform the batch processing on a predetermined schedule (for example, once a day, every twelve hours, or the like). Alternatively or in addition, the application 250 may perform the batch processing on an as needed bases (for example, in response to receiving a manual request). Accordingly, in some embodiments, the application 250 provides a service that enables organizations to analyze large amounts of data (for example, login data included in the received electronic files) in a secure offline process.

The administrator device 105 may include one or more desktop computers, laptop computers, tablet computers, terminals, smart telephones, smart televisions, smart wearables, servers, databases, other types of computing devices, or a combination thereof. Although not illustrated in FIG. 1, the administrator device 105 may include similar components as the Server 110, such as an electronic processor, a memory, and a communication interface. The administrator device 105 may also include one or more input devices (for example, a keyboard, a keypad, a mouse, a joystick, a touchscreen, and the like) and one or more output devices (for example, a display device, a touchscreen, a printer, a speaker, and the like) that receive input from a user and provide output to a user.

The administrator device 105 may be used by an administrator (or another user) for managing user credentials for an organization (for example, for generating and managing secured file transfer credentials that may be used to submit log files for risk analysis via batch processing). User credentials may enable access to the Server 110 (for example, the offline login analysis service provided by the Server 110). In some embodiments, an administrator receives (via the administrator device 105) an access request for accessing the offline login analysis service from a requesting user of the organization. The requesting user may generate and transmit the access request with the user device 115. In response to receiving the access request, the administrator (via the administrator device 105) may generate and transmit user credentials for the requesting user to the requesting user (i.e., to the user device 115). In some embodiments, the administrator may also transmit the user credentials (or a copy thereof) to the Server 110 (for performing a user credential verification process). The requesting user may then use the received user credentials for gaining access to the offline login analysis service provided by the Server 110. As one example, the user credentials may include a username and password. A requesting user may provide the username and password as part of a login process for gaining access to the offline login analysis service provided by the Server 110.

The user device 115 may include one or more desktop computers, laptop computers, tablet computers, terminals, smart telephones, smart televisions, smart wearables, servers, databases, other types of computing devices, or a combination thereof. Although not illustrated in FIG. 1, the user device 115 may include similar components as the Server 110, such as an electronic processor, a memory, and a communication interface. The user device 115 may also include one or more input devices (keyboard, keypad, mouse, joystick, touchscreen, and the like) and one or more output devices (display device, touchscreen, printer, speaker, and the like) that receive input from a user and provide output to a user. For example, as illustrated in FIG. 1, the user device 115 includes a display device.

As noted above, an organization (for example, a requesting user) may interact with the user device 115 to access the offline login analysis service provided by the Server 110. As one example, the organization (or a user thereof) may interact with the user device 115 to access the offline login analysis service by requesting and providing user credentials (via, for example, the credentials API). After gaining access to the offline login analysis service, a requesting user may provide (or upload) one or more electronic files such that the offline login analysis service may determine fraudulent user login behavior based on the data included in the electronic file(s) such that the requesting user may determine or detect fraudulent users. An electronic file may include, for example, a comma-separated values file. The electronic file may be a log file including customer login data. Customer login data may include, for example, login attempt outcome data, login attempt timestamp data, geolocation data, browser data, velocity tracking data, HyperLogLog data, blocked list data, customer-related data, and the like. In some embodiments, the electronic file is provided (or uploaded) via SFTP.

Figure 3:
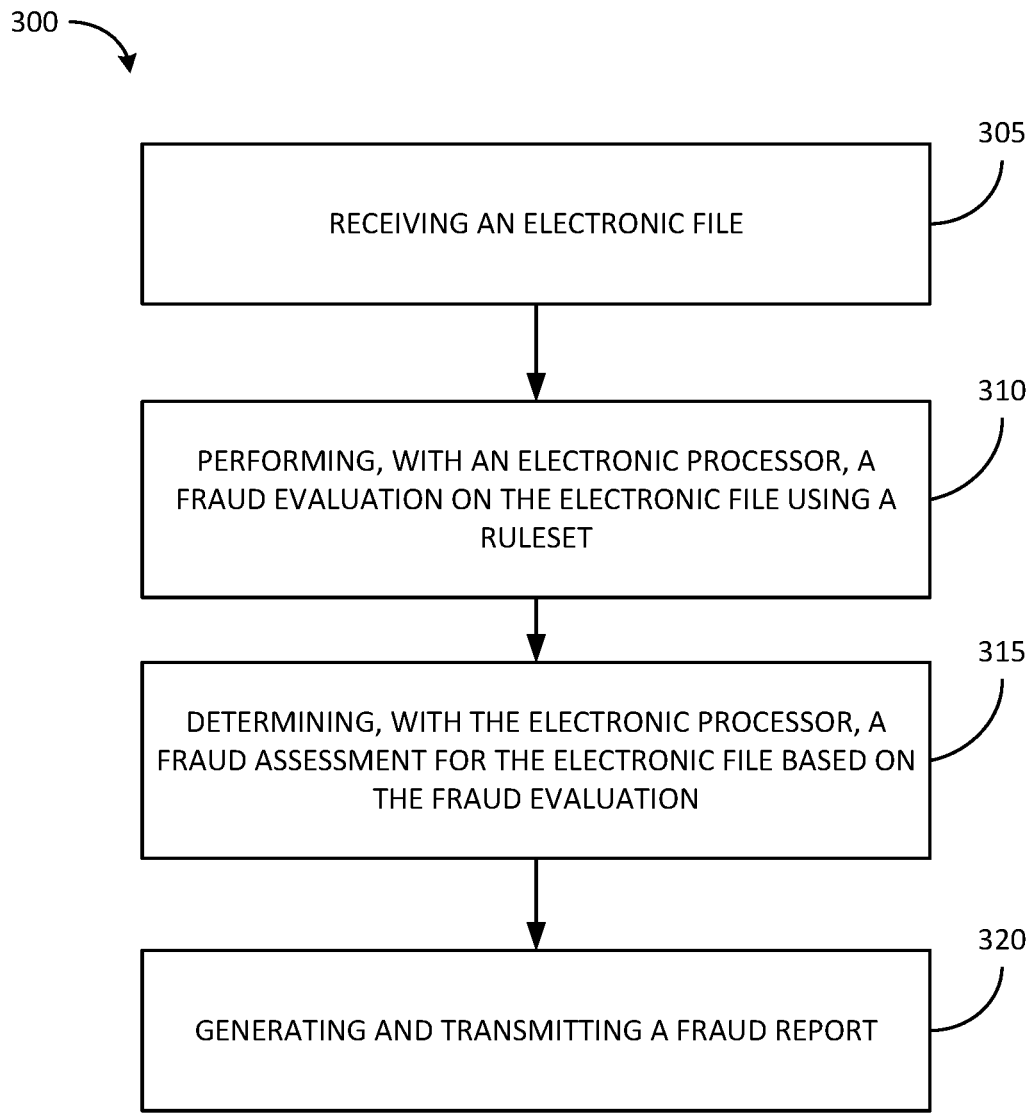
FIG. 3 is a flowchart of a method for providing offline fraud assessments with respect to customer login data using the system of FIG. 1 according to some embodiments.

FIG. 3 is a flowchart illustrating a method 300 for providing offline fraud assessments with respect to customer login data according to some embodiments. The method 300 is described as being performed by the Server 110 and, in some embodiments, the electronic processor 200 executing the application 250. However, as noted above, the functionality performed by the Server 110 (or a portion thereof) may be performed by other devices (via an electronic processor executing instructions), including, for example, the administrator device 105, the user device 115, or a combination thereof.

As seen in FIG. 3, the method 300 includes receiving, with the electronic processor 200, an electronic file (at block 305). In some embodiments, the electronic processor 200 receives (through the communication interface 210) the electronic file from the user device 115 via the communication network 150. As noted above, the electronic file may be a log file including customer login data. In some embodiments, the electronic file is a comma-separated values file. Alternatively or in addition, in some embodiments, the electronic processor 200 receives the electronic file via SFTP.

In some embodiments, before the electronic processor 200 receives the electronic file (at block 305), the electronic processor 200 performs a user credential verification process. In some embodiments, the electronic processor 200 performs the user credential verification process in combination with the administrator device 105. The electronic processor 200 may perform the user credential verification process in response to receiving a log-in request from the user device 115. In some embodiments, the log-in request may include user credentials associated with a specific organization or requesting user. In response to confirming the user credentials, the electronic processor 200 may then accept uploads from the requesting user. As one example, once a requesting user has access to the offline login analysis service provided by the Server 110 (for example, the electronic processor 200), the requesting user may upload or provide the electronic file, which is received by the electronic processor 200 (at block 305 of the method 300).

In response to receiving the request for the electronic file (at block 305), the electronic processor 200 performs a fraud evaluation on the electronic file using a ruleset (at block 310). A ruleset may include one or more rules related a specific fraud analysis or module. In other words, a ruleset may be associated with a specific fraud analysis or function. An example rule may include, for example, when there has been thirty or more failed log in attempts within a specific time frame, such as thirty minutes, then fraud is detected. In some embodiments, a specific ruleset for the offline login batch service may be based around account takeover. The offline login batch service may be extended to provide other types of analysis with a different ruleset. Such a ruleset is a standard predetermined ruleset that analyzes various data points and provides an overall analysis of whether fraud has occurred or not. As one example, a ruleset may include a set of rules associated with performing a geolocation fraud analysis, which detects fraud based on geolocation information. As another example, the ruleset may include a set of rules associated with performing a velocity tracking fraud analysis, which detects fraud based on velocity tracking data. Accordingly, in some embodiments, the ruleset is a predetermined ruleset. Alternatively or in addition, in some embodiments, the electronic processor 200 performs the fraud evaluation on the electronic file using more than one ruleset. As one example, the electronic processor 200 may perform the fraud evaluation on the electronic file using a first ruleset and a second ruleset. In other words, in some embodiments, the fraud evaluation is based on one or more rulesets applied to the electronic file (i.e., the data included therein). Accordingly, in some embodiments, the electronic processor 200 performs the fraud evaluation on the electronic file by accessing one or more rulesets. After accessing the one or more rulesets, the electronic processor 200 may then apply the one or more rulesets against the electronic file (i.e., the data included therein). In some embodiments, the electronic processor 200 runs (or performs) the fraud evaluation against one or more rulesets by determining which rulesets need to be called asynchronously based on one or more data attributes (for example, IP address, identification, user agent, login status, and the like).

The electronic processor 200 then determines a fraud assessment for the electronic file based on the fraud evaluation (at block 315). The fraud assessment may include, for example, a fraud score or outcome for each ruleset, a risk score, a trigger (for example, a rule that was determined to be at risk), an identification of at least a portion of data included in the electronic file associated with potential fraud, and the like. As one example, the fraud assessment may include a list of fraudulent users, log-in attempts, or a combination thereof. The electronic processor 200 may determine the fraud assessment based on an outcome or result of applying the ruleset to the electronic file (or the data included therein). In some embodiments, during the fraud assessment, one or more risk labels are generated in response to a request triggering a specific rule. As one example, when the request triggers a rule related to a block list, an example risk label may include the following "ato_ip_blocklist—IP is in block list."

After determining the fraud assessment for the electronic file (at block 315), the electronic processor 200 then generates and transmits a fraud report (at block 320). The fraud report may be based on (or include) the fraud assessment determined by the electronic processor at block 315. Accordingly, in some embodiments, the fraud report may include, for example, a fraud score or outcome for each ruleset, a risk score, a trigger (for example, a rule that was determined to be at risk), an identification of at least a portion of data included in the electronic file associated with potential fraud, and the like. rs of 3 while blocking risk factors of 5).

In some embodiments, the electronic processor 200 transmits the fraud report to the user device 115 (via, for example, the communication network 150). The electronic processor 200 may transmit the fraud report as, for example, a push message, an electronic message (for example, an email), an electronic notification, or the like. In response to receiving the fraud score, the user device 115 may provide or display the fraud report to a user of the user device 115. The user of the user device 115 may further interact with the fraud report via the user device 115 (for example, view a list of fraudulent users or log-in attempts).

Figure 4:
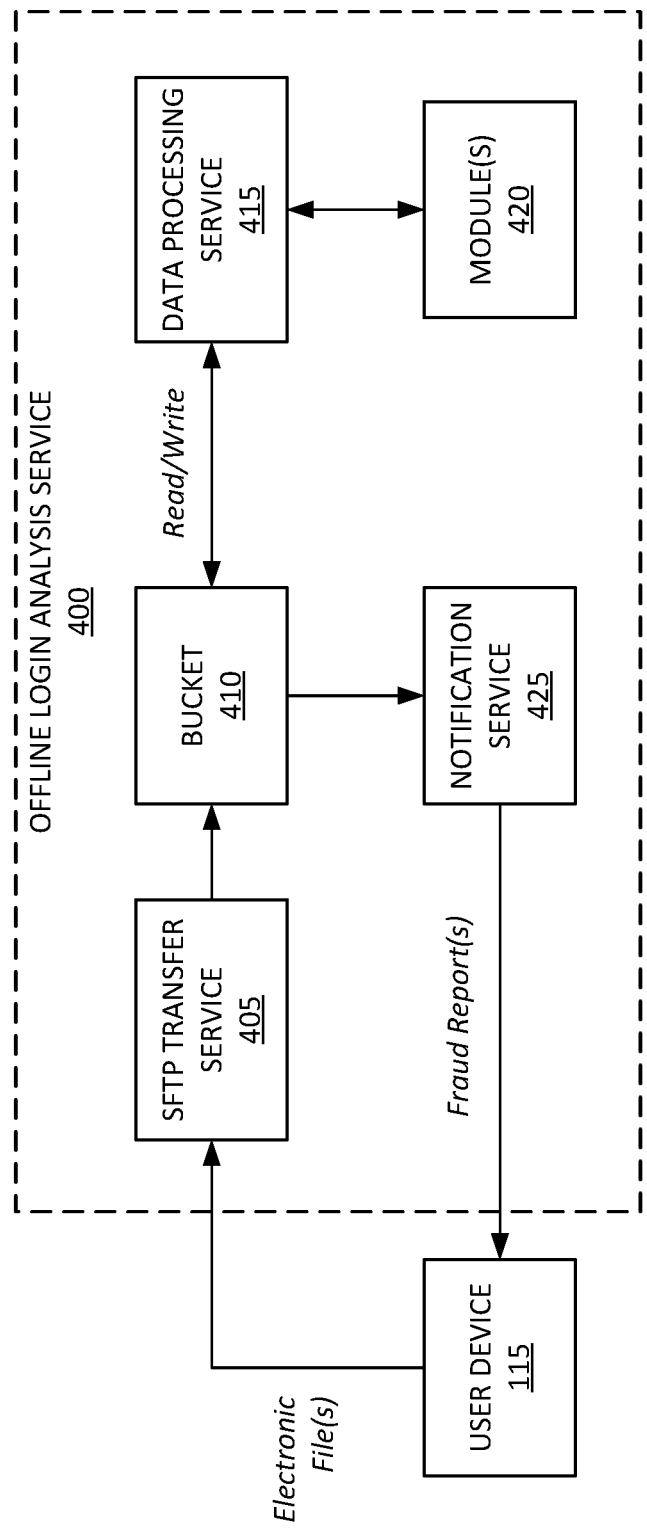
FIG. 4 schematically illustrates design components of an offline login analysis service provided by the system of FIG. 1 according to some embodiments.

FIG. 4 schematically illustrates design components of an offline login analysis service 400 provided by the system of FIG. 1 according to some embodiments. As seen in FIG. 4, in some embodiments, the offline login analysis service 400 includes an SFTP transfer service 405, a bucket 410, a data processing service 415, one or more modules 420 (for example, rulesets), and a notification service 425. In some embodiments, the offline login analysis service 400 includes fewer, additional, or different components than illustrated in FIG. 4. Also, in some embodiments, one or more of the components of the offline login analysis service 400 may be distributed among multiple servers, databases, or devices, combined within a single server, database, or device, or a combination thereof. In some embodiments, one or more of the components illustrated in FIG. 4 are cloud-based services.

In the example illustrated in FIG. 4, the user device 115 uploads (or provides) an electronic file to the offline login analysis service 400. The SFTP transfer service 405 receives the electronic file from the user device 115. The bucket 410 may function as a data buffer or temporary data storage for the data included in the electronic file (for example, while the data is being moved between processes performed as part of the offline login analysis service 400). Once the electronic file is received, the data processing service 415 performs data extraction and evaluation processes on the electronic file. As seen in FIG. 4, the data processing service 415 may interact with the one or more modules 420 (for example, one or more rulesets) as part of the data extraction and evaluation processes (for example, determine fraudulent login behavior). The result(s) of the data extraction and evaluation processes performed by the data processing service 415 may be written to the bucket 410. In response to the result(s) being written to the bucket 410, the notification service 425 may be triggered to generate and transmit one or more fraud reports to the user device 115.

Figure 5:
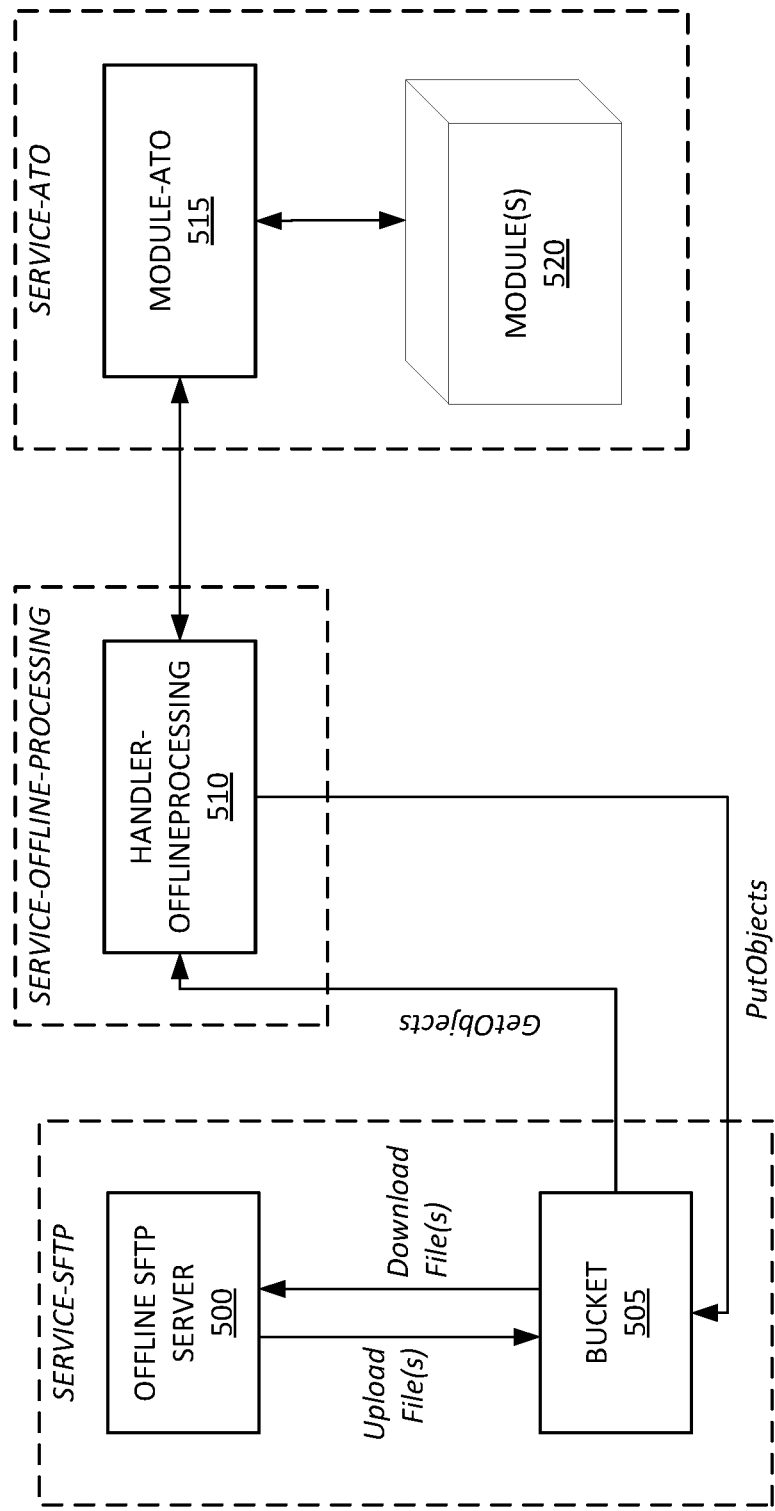
FIG. 5 schematically illustrates an example design of a credentials API for verifying access to the server of FIG. 2 according to some embodiments.

FIG. 5 schematically illustrates an example design of a credentials API for verifying access to the Server 110 of FIG. 2 according to some embodiments. Created user credentials are used to provide access to the server 110. A user logs into the server 110 using the created user credential(s). After a successful log in, the user may upload a new csv file, review or interact with the report of the fraud analysis for a previously upload file, or the like. When a user uploads a csv file to the server 110, the csv file may be saved to a S3 bucket, which may trigger the pipeline to start the fraud analysis.

As seen in FIG. 5, the credentials API may include an offline SFTP server component 500 (for example, the Server 110), a bucket component 505 (for example, the bucket 410), a service-offline-processing component 510, a module-ATO component 515, and a modules component 520. The offline login analysis service 400 may be used to create an API gateway that may function with the Server 110 (for example, the credentials API). In some embodiments, the API gateway enables a Create User function, a List Users function, a Delete User function, and a Get Particular User function. Accordingly, the following API endpoints may be created (for example, for creating, retrieving, and deleting user credentials). In some embodiments, the API endpoints are implemented using serverless cloud technology and scale automatically depending on a traffic load (i.e., a number of requests).

```
POST request: /sftp/credentials
  Request body: application/json
    {
      "label": "batchSubmitter"
    }
  Response: application/json
    {
      "connection": "sftp://sftp.ato-dev-aion.nudatasecurity.com:22",
      "id": "id-example-1",
      "key": "rsa-key string"
    }
GET request :/sftp/credentials
  Response: application/json
    {
      "idList": [
        "id-example-1",
        "id-example-2"
      ]
    }
DELETE request :/sftp/credentials/<sftp_userId>
  Response: 200 OK
GET request for a particular user: /sftp/credentials/<sftp_userId>
  Response: application/json
    {
      "id": "id-example-1"
      "key": "rsa-key string"
    }
```

Thus, the embodiments described herein provide, among other things, methods and systems for providing offline fraud assessments with respect to customer login data using SFTP batch processing and credentials API(s). Various features and advantages of the embodiments are set forth in the following claims.

It is to be understood that the embodiments are not limited in its application to the details of construction and the arrangement of components set forth in the following description or illustrated in the accompanying drawings. The embodiments are capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

What is claimed is:

1. A system for providing offline fraud assessments with respect to customer login data, the system comprising:
   an electronic processor configured to
      receive, from a user device, an electronic file, wherein the electronic file is a log file including customer login data, wherein the customer login data includes login attempt data, browser data, velocity tracking data, and HyperLogLog data,
      perform an offline batch processing on the electronic file, wherein the offline batch processing includes performing a fraud evaluation on the electronic file by using a ruleset from a set of rulesets, the ruleset determined based on a data attribute of data of the electronic file, wherein the data attribute is an attribute associated with a customer login device,
      determine a fraud assessment for the electronic file based on the fraud evaluation, and
      generate and transmit a fraud report for display, the fraud report including the fraud assessment.

2. The system of claim 1, wherein the log file of the electronic file further includes login attempt outcome data, login attempt timestamp data, geolocation data, and blocked list data.

3. The system of claim 1, wherein the electronic file is a comma-separated values file.

4. The system of claim 1, wherein the electronic file is received via secure file transfer protocol ("SFTP").

5. The system of claim 1, wherein the ruleset is associated with a fraud analysis function.

6. The system of claim 1, wherein the electronic processor is configured to generate a risk label in response to a request triggering a rule included in the ruleset.

7. The system of claim 1, wherein the electronic processor is further configured to
   receive, from a requesting user, a request for user credentials, and
   in response to verifying the requesting user, provide user credentials for the requesting user.

8. The system of claim 7, wherein the electronic processor is further configured to
   receive, from the requesting user, a log-in request using the user credentials, and
   in response to receiving the log-in request, verify the user credentials.

9. The system of claim 8, wherein the electronic processor is configured to receive the electronic file after verifying the user credentials.

10. A method for providing offline fraud assessments with respect to customer login data, the method comprising:
    receiving, from a user device via secure file transfer protocol ("SFTP"), an electronic file, wherein the electronic file is a log file including customer login data, wherein the customer login data includes login attempt data, browser data, velocity tracking data, and HyperLogLog data;
    performing, with an electronic processor, an offline batch processing on the electronic file, wherein the offline batch processing includes performing a fraud evaluation on the electronic file using a ruleset from a set of rulesets, wherein the ruleset is determined based on a data attribute of data of the electronic file, wherein the data attribute is an attribute associated with a customer login device;
    determining, with the electronic processor, a fraud assessment for the electronic file based on the fraud evaluation; and
    generating and transmitting, with the electronic processor, a fraud report for display, the fraud report including the fraud assessment.

11. The method of claim 10, wherein the file includes login attempt outcome data, login attempt timestamp data, geolocation data, and blocked list data.

12. The method of claim 11, wherein the electronic file includes a comma-separated values file.

13. The method of claim 11, wherein performing the fraud evaluation on the electronic file includes performing the fraud evaluation on the electronic file using a ruleset associated with a fraud analysis function.

14. The method of claim 11, wherein generating and transmitting the fraud report includes generating and transmitting a fraud report identifying potential fraud associated with at least a portion of data included in the electronic file.

15. The method of claim 11, further comprising:
    receiving, from a requesting user, a request for user credentials; and
    in response to verifying the requesting user, providing user credentials for the requesting user.

16. The method of claim 15, further comprising:
    receiving, from the requesting user, a log-in request using the user credentials, and
    in response to receiving the log-in request, verifying the user credentials.

17. The method of claim 16, wherein receiving the electronic file includes receiving the electronic file after verifying the user credentials.

18. A non-transitory, computer-readable medium storing instructions that, when executed by an electronic processor, perform a set of functions, the set of functions comprising:
    receiving, from a user device via secure file transfer protocol ("SFTP"), an electronic file as a comma-separated values file, wherein the electronic file is a log file including customer login data, wherein the customer login data includes login attempt data, browser data, velocity tracking data, and HyperLogLog data;
    performing, with an electronic processor, an offline batch processing on the electronic file, wherein the offline batch processing includes performing a fraud evaluation on the electronic file by using a ruleset from a set of rulesets, the determined based on a data attribute of data of the electronic file, wherein the data attribute is an attribute associated with a customer login device;

determining, with the electronic processor, a fraud assessment for the electronic file based on the fraud evaluation; and generating and transmitting, with the electronic processor, a fraud report for display, the fraud report including the fraud assessment.

19. The computer-readable medium of claim 18, wherein the set of functions further comprises:

receiving, from a requesting user, a request for user credentials; and in response to verifying the requesting user, providing user credentials for the requesting user.

20. The computer-readable medium of claim 19, wherein the set of functions further comprises:

receiving, from the requesting user, a log-in request using the user credentials, and in response to receiving the log-in request, verifying the user credentials, wherein the electronic file is received after verifying the user credentials.

* * * * *